(12) United States Patent
Amb et al.

(10) Patent No.: US 9,093,193 B2
(45) Date of Patent: Jul. 28, 2015

(54) PROCESSING METHOD FOR WATER SOLUBLE POLYMERIC MATERIALS

(75) Inventors: Chad Martin Amb, Midland, MI (US);
Pierre Marc Beaujuge, Jeddah (SA);
John R. Reynolds, Gainesville, FL (US)

(73) Assignee: UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 957 days.

(21) Appl. No.: 13/196,412

(22) Filed: Aug. 2, 2011

(65) Prior Publication Data

US 2012/0032104 A1 Feb. 9, 2012

Related U.S. Application Data

(60) Provisional application No. 61/369,821, filed on Aug. 2, 2010.

(51) Int. Cl.

| H01B 1/00 | (2006.01) |
|---|---|
| H01G 9/02 | (2006.01) |
| B05D 5/12 | (2006.01) |
| H01B 1/12 | (2006.01) |
| H01G 9/022 | (2006.01) |

(52) U.S. Cl.
CPC .............. *H01B 1/122* (2013.01); *H01G 9/022* (2013.01); *C08G 2261/3223* (2013.01); *Y02E 60/13* (2013.01)

(58) Field of Classification Search
None
See application file for complete search history.

(56) References Cited

U.S. PATENT DOCUMENTS

| 5,980,784 A | * | 11/1999 | Shimizu et al. ................ 252/500 |
| 2007/0066755 A1 | * | 3/2007 | Hsu et al. ....................... 525/186 |
| 2009/0221763 A1 | | 9/2009 | Reynolds et al. |
| 2010/0038597 A1 | | 2/2010 | Reynolds et al. |
| 2013/0150552 A1 | | 6/2013 | Amb et al. |

FOREIGN PATENT DOCUMENTS

| CN | 101573404 | 11/2009 |
|---|---|---|
| CN | 102482569 | 5/2012 |
| JP | H08-013873 B | 2/1996 |
| JP | 2008-512523 A | 4/2008 |

(Continued)

OTHER PUBLICATIONS

Cutler, C. et al., "PEDOT Poyelectrolyte Based Electrochromic Films via Electrostatic Adsorption," *Advanced Materials*, May 3, 2002, pp. 684-688, vol. 14, No. 9.

(Continued)

*Primary Examiner* — Harold Pyon
*Assistant Examiner* — Jaison Thomas
(74) *Attorney, Agent, or Firm* — Saliwanchik, Lloyd & Eisensechenk

(57) ABSTRACT

Embodiments of the invention are directed to a method of forming a film of an insoluble conjugated polymer (CP) by deposition of an ionic CP from aqueous solution and converting the ionic CP to the insoluble CP. The ionic CP can be the salt of a carboxylic acid, sulfonic acid, phosphonic acid, boronic acid, amine, imine, phosphine, thioether, or complexed bidentate or polydentate ligand. The insoluble CP film can be used with an aqueous electrolyte solution for use as: an electrochromic film; charge injection layer for a solar cell, LED, and FET; conventional paints; supercapacitor; battery; electronic paper; anti-static coating; transparent conductor; sensors; anti-microbial coating; adhesive; RFID; or memory system.

26 Claims, 9 Drawing Sheets

(56) References Cited

FOREIGN PATENT DOCUMENTS

| JP | 2009-524737 A | 7/2009 |
|----|---------------|--------|
| JP | 2012-509984 A | 4/2012 |
| WO | WO 87-005914 | 10/1987 |
| WO | WO 2006-029231 | 3/2006 |
| WO | WO 2007/041724 A1 | 4/2007 |
| WO | WO 2007-087587 | 8/2007 |
| WO | WO 2008/118704 A2 | 10/2008 |
| WO | WO 2009-058877 | 5/2009 |
| WO | WO 2009/058877 A1 | 5/2009 |
| WO | WO 2009/117025 A1 | 9/2009 |
| WO | WO 2010-062948 | 6/2010 |
| WO | WO 2010/062948 A2 | 6/2010 |
| WO | WO 2010/138566 A2 | 12/2010 |
| WO | WO 2011/003076 A2 | 1/2011 |

OTHER PUBLICATIONS

Cutler, C. et al., "Alkoxysulfonate-Functionalized PEDOT Polyelectrolyte Multilayer Films: Electrochromic and Hole Transport Materials," *Macromolecules*, 2005, pp. 3068-3074, vol. 38.

Jain, V. et al., "Synthesis and Characterization of Regioregular Water-Soluble 3,4-Propylenedioxythiophene Derivative and Its Application in the Fabrication of High-Contrast Solid-State Electrochromic Devices," *Macromolecules*, 2009, pp. 135-140, vol. 42.

Ha, Y-H. et al., "Conductivity tuning of poly(3,4-ethylenedioxythiophene) through side-group cleavage," *Synthetic Metal*, 2004, pp. 101-105, vol. 144.

Reeves, B.D. et al., "Spray Coatable Electrochromic Dioxythiophene Polymers with High Coloration Efficiencies," *Macromolecules*, 2004, pp. 7559-7569, vol. 37.

\* cited by examiner

Charged Groups         Treatment

*Anions*

→ acid → Neutral Groups

*Cations*

R = H or alkyl

Can be aromatic or aliphatic
R = H or alkyl → base or nucleophile → Neutral Groups R = H or alkyl R = alkyl Stronger Chelating agent

*i*: pTSA, toluene; *ii* NaCN, DMF; *iii* NaOH, then HCl; *iv* EDCI/DMAP, DCM, 1-dodecanol;
*v* FeCl₃, CHCl₃; *vi* KOH, MeOH; *vii* pTSA·1.5 H₂O, MEOH a)

b)

a)

b)

PROCESSING METHOD FOR WATER SOLUBLE POLYMERIC MATERIALS

CROSS-REFERENCE TO RELATED APPLICATION

The present application claims the benefit of U.S. Provisional Application Ser. No. 61/369,821, filed Aug. 2, 2010, which is hereby incorporated by reference herein in its entirety, including any figures, tables, or drawings.

This invention was made with government support under Contract No. FA9550-09-1-0320 awarded by the Air Force Office of Scientific Research. The government has certain rights in the invention.

BACKGROUND OF INVENTION

Unlike liquid-crystal (LC) and light-emitting display (LED) technologies, non-emissive electrochromic (EC) systems benefit from their ability to be viewed from a wide range of angles under a wide range of ambient lighting conditions, such as direct sunlight. The potential for integration of EC systems into electrochromic devices (ECDs), such as: low-driving-voltage powered information panels and tags; smart windows and mirrors; and portable operating systems, including shape-conforming electronic papers, has promoted development of novel EC materials. The ability to print discrete electrochromic pixels can allow the combining of colors in portable display applications, such as information tags and electronic papers.

When compared to their inorganic counterparts (e.g. $MoO_3$, $NiO_x$), non-emissive organic electrochromics offer the potential for cost-effective, ambient atmosphere solution-processing over large areas and mechanically deformable surfaces. Viable organic EC materials for the development of commercially attractive ECDs must be synthetically accessible, have long-term redox stability, be processable from solution, and display good film-forming properties. The combination of these features is difficult to attain with small molecules and has motivated the use of $\pi$ conjugated electroactive polymers (ECPs).

The utility of pi-conjugated polymers (CPs) for electrochromic applications was first suggested independently in Gazard et al., "Electrooptical Properties of Thin Films Of Polyheterocycles" *Journal de Physique Colloques* 1983, 44, 537-42 and Druy et al., Poly (2,2'-Bithiophene): an Electrochromic Conducting Polymer" *Journal de Physique Colloques* 1983, 44, 595-8, where redox switching of electropolymerized polythiophenes resulted in a color change. Inspection of their red-to-blue color-changing pattern on progressive electrochemical oxidation revealed a p-doping process governed by the bleaching of their pi-pi* transition in the visible with simultaneous appearance of infrared charge-carrier optical transitions tailing into the red region to induce a characteristic blue oxidized state. In general, charged carriers balanced with counter ions are produced along pi-conjugated organic polymer backbones subjected to increasing doping levels. With the introduction of charged carriers, namely radical cations (polarons) and dications (bipolarons), new optical transitions arise at longer wavelengths, and this process is accompanied by the simultaneous depletion of the ground-state optical absorption of the system being doped. The ability of the backbone to assume a stable quinoidal geometry influences the level of doping achievable, and, in turn, the extent of bleaching attained by the ground state absorption.

In addition to the synthetic accessibility of ECPs, the ability to achieve palettes of colors by changing the polymer's repeating unit structures, and the disposition of the structures along the chain, makes CP systems notable for development of processable EC materials. For this reason, extensive research efforts have been directed to tailoring the complex interplay between polymer structure and optical absorption in systems exhibiting important spectral changes in their successive redox states. Since the discovery of electrochromic effects in substituted and unsubstituted polythiophenes, a library of thiophene-, pyrrole-, and many other heterocycle-containing pi-conjugated electrochromic hybrids, which reflect or transmit distinct colors on electrochemical doping, have been developed that span all the useful colors for a display device. While multichromic polymers, those having different colored states when fully reduced or oxidized, may be useful in configurations where the attainable color states on redox switching match the color requirements specific to the application being considered, the ability to turn colors "on" and "off" is even more attractive. When "off", the ECP has a transmissive redox state where all visible absorption of the chromophore is fully depleted with absorption in the near-IR allowing a device made thereof to transmit all visible colors, but when "on", the ECP is in a redox state with a strong visible absorption. Cathodically-coloring ECPs switch from a colored neutral state to a transmissive state on electrochemical oxidation, while anodically-coloring ECPs switch from a transmissive neutral state, generally where the ground state absorption lies in the UV, to a colored oxidized state on doping, where the absorption lies within the visible spectrum. Ultimately, the extent of transmissivity of the "colorless" state depends on the position of the charge carrier transitions in a cathodically-coloring ECP, or on the position of the ground state absorption in the anodically-coloring ECP, relative to the visible spectrum.

In spite of the quantity of research directed to the synthesis and characterization of $\pi$-conjugated ECPs with desirable color states, examples of cathodically- and anodically-coloring polymers remains sparse when compared to multichromic ECPs. The most widely reported cathodically-coloring ECPs are poly(dioxythiophene)s such as poly(3,4-ethylenedioxythiophene)s (PEDOTs) and poly(3,4-propylenedioxythiophene)s (PProDOTs), which are easily oxidized from a neutral purple-blue-colored state to a highly transmissive doped state. The need to fine-tune colors has lead to a number of spectral engineering principles for ECPs. One approach to spectral control is the 'donor-acceptor' approach, where electron-rich and electron-deficient moieties alternate along a $\pi$-conjugated backbone. This approach has produced dual-band and broadly-absorbing chromophores that exhibit neutral color states that, generally, have not been attained by $\pi$-conjugated ECPs, for example blue-green, green and black colored states.

The promotion of ECPs to the forefront of organic electronics with commercial applicability requires a parallel development of sustainable solution-processing approaches that are low-cost and can be carried out under ambient conditions with non-toxic solvents and additives amenable to high throughput. While a number of $\pi$-conjugated electrochromic polymers (ECPs) having varying color states and redox switching properties have been developed, only a limited number of electrochromic polymers are print- or spray-processable from conventional organic solvents. In general, ECPs have used hydrocarbon or ethereal pendant groups to render the polymers soluble in organic solvents, requiring the use of flammable and environmentally hazardous solvents such as toluene, chloroform, or tetrahydrofuran for processing. Once processed, the ECP films must also be redox switched in high dielectric organic solvents, such as propylene carbonate or acetonitrile, and employ expensive organic-soluble electrolyte salts, such as lithium bis-trifluoromethanesulfonimide.

No attempt to print or spray thin films of ECPs from aqueous solution has been reported, likely due to problems of solubility and/or film-formability from a polar medium having a relatively low vapor pressure. The sole example of printing a conjugated polymer (CP) using an aqueous vehicle has been the printing of an aqueous emulsion of polystyrene sulfonate doped poly(ethylene-3,4-dioxythiophene) (PEDOT:PSS); however, most CPs do not disperse in water to a sufficient concentration to utilize a printing method. The first water soluble CPs were introduced in the late 1980's and polymers processable from aqueous solvents have been used in applications such as biochemical sensing, organic light emitting diodes, organic photovoltaics, and field effect transistors. In applications where multiple layers of different materials are needed, water soluble materials can be orthogonally deposited with materials that are soluble in and processed from organic solvents. In the vast majority of cases, the deposition method employed for the fabrication of solid state devices made with organics is spin-coating or layer-by-layer depositions when ionic molecular structures can be accessed. Neither method has shown to be commercially viable to date and high-throughput approaches remain undeveloped. Low-cost and high-throughput viable processing techniques based on environmentally benign aqueous solutions is desired for ECP and other CP films for use in devices, such as biochemical sensors, organic light emitting diodes, organic photovoltaics cells, field effect transistors, and electrochromic displays.

BRIEF SUMMARY

Embodiments of the invention are directed to a method by which an insoluble π-conjugated polymer (CP) film can be deposited, where a precursor CP that is dissolved or suspended in an organic solvent is transformed into an ionic CP solution or suspension, which is subsequently isolated and dissolved to form an aqueous solution from which it can be deposited as a film and converted into the insoluble CP film. The insoluble CP film is insoluble in aqueous or organic liquids and can be used as an active layer in a device, such as an electrochromic film or as a charge injection layer for a solar cell, LED or FET, or serve as the active material in a supercapacitor, battery, electronic paper, anti-static coating, transparent conductor, sensor, anti-microbial coating, adhesive, RFID, and memory systems in conjunction with an aqueous electrolyte solution. The insoluble CP film can be used with an aqueous electrolyte. Deposition of the aqueous ionic CP solution can be carried out by a printing, roll-to-roll, or spray technique, such as screen printing, inkjet printing, spray-casting, offset printing, rotogravure, slot-die coating, or flexography to form a thin film.

The precursor CP contains a sufficient quantity of repeating units having one or more side chains, which includes one or more functionality that acts as the precursor to an ionic functionality. Examples of such functionalities include: esters of a carboxylic acid, thiocarboxylic acid, dithiocarboxylic acid, sulfonic acid, phosphonic acid, or boronic acid; an amine, imine, phosphine or thioether; or a bidentate or polydentate ligand, where these functionalities can be converted into ionic functionalities by: base hydrolysis of the ester, protonation or reaction with an electrophilic carbon; or exposure to a metal salt, respectively.

The film of the ionic CP can be rendered insoluble in water and other solvents by converting the ionic functionality on the side chains to a non-ionic functionality. The conversion can be promoted by addition of an acid, a base, a nucleophile, a stronger bi or polydentate ligand, or by a thermally induced substitution or elimination reaction depending upon the nature of the ionic functionality. An insoluble ionic CP can be generated by a counter ion exchange or a ligand exchange, where the exchanged counter ion is a different counter ion that produces an inherently insoluble salt or forms a network by pairing or complexing with a plurality of ionic functionalities in the ionic CP.

DETAILED DISCLOSURE

Figure 1:
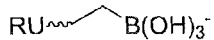
FIG. 1 shows exemplary ionic functional groups that can be attached to repeating units (RU) of an ionic CP through a side chain of 1 to 20 carbon atoms and exemplary reagents appropriate to transform the ionic groups to a neutral functional group and render the CP insoluble in accordance with embodiments of the invention.
Figure 1:
Figure 1:
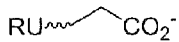
Figure 1:
Figure 1:
Figure 1:
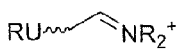
Figure 1:
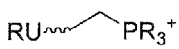
Figure 1:
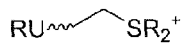
Figure 1:
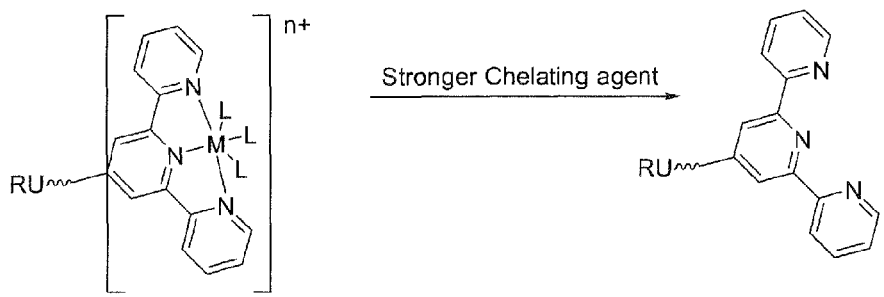

Embodiments of the invention are directed to a method for achieving water-soluble ionic conjugated polymers (CPs) that can be deposited as a film on a surface from aqueous solution. The process involves forming a non-ionic CP precursor that is soluble in an organic solvent. The organic solubility of the CP arises from having side chains appended to repeating units in the π-conjugated polymer backbone. The side chain can then be rendered ionic by a subsequent reaction to provide solubility in an aqueous medium. In one embodiment, a fine solid dispersion of the CP precursor in an alcohol, for example methanol or ethanol, or another polar solvent is combined with a cleaving reagent, for example an acid or base to form the ionic CP. Although the ionization reaction to form the ionic CP can involve bond cleavage, in another embodiment of the invention ionization can involve bond formation. The CP precursor and ionic CP remain dispersed during the transformation to the ionic water soluble state, allowing recovery of the suspended ionic CP by a simple separation from solution, such as filtration or centrifugation.

The isolated ionic CP is subsequently dissolved in water and the water solution is used to deposit a thin film, using a printing, coating, or spray technique, for example screen printing, inkjet printing, spray-casting, offset printing, rotogravure, slot-die coating, or flexography. When ethanol, methanol, or other organic solvent more volatile than water is used, often the organic solvent can be removed by the difference in volatility or as an azeotrope, to the extent that the water solution of the ionic CP and the subsequent insoluble CP can be effectively freed of an organic solvent. As such, process safety can be enhanced during the deposition of the film and properties of the films, for example, in some cases the stability, can be enhanced. In some embodiments of the invention, the preparation of a film having a solvent in addition to water can be used to promote specific properties and compatibilities with other layers.

In an embodiment of the invention, the deposited ionic CP film can be subsequently washed with a solution that converts a sufficient portion of the charged sites of the ionic CPs to water insoluble CPs having a non-ionic form, which, in some embodiments, is a neutralized form, to render the film insoluble in water. The water-insoluble CPs can be water swellable. In another embodiment of the invention, the charged group of the ionic CPs can be modified without neutralization, or the counter ion, in the repeating unit bound to one or more charged groups of the ionic CPs, can be altered or exchanged to transform the water soluble ionic CPs into water insoluble CPs that remains ionic. The resulting water-insoluble CP films can be electrochemically switched in the presence of an aqueous electrolyte medium. In embodiments of the invention, the CP precursor can be a homopolymer or a copolymer of any structure that contains a sufficient portion of side chains that can be rendered ionic in a manner that the ionic ECP is soluble in an aqueous solution.

Recently, the inventors' research group has disclosed a blue/purple-to-highly transmissive electrochromic polymer (ECP) with cleavable solubilizing side-chains, Reynolds et al., "Chemical Defunctionalization of Polymeric Alkylenedioxyheterocyclics" U.S. Patent Application Publication No. 20090221763, which is incorporated by reference herein. The side chains of the CPs disclosed in Reynolds et al. were deposited as a film from an organic solution and defunctionalized of the hydrophobic solubilizing side chains to render the film insoluble in conventional organic solvents. The defunctionalizable groups of the CPs reside in carboxylic acid derivative functionalized alkylenedioxyheterocycles repeating units, and cleavage of the carboxylic acid derivative is the mode of defunctionalization. The isolated products of the cleavage reactions disclosed in Reynolds et al. are not ionic CPs and are not water soluble. However, it has been discovered that a polycarboxylic acid derivative functionalized alkylenedioxyheterocycle polymer as disclosed in Reynolds et al. can be converted into an ionic polymer that can form a water solution and that can be used in the subject method, according to an embodiment of the invention.

According to an embodiment of the invention, a plurality of the repeating units of the CP can be singularly, or in combination, an alkylenedioxyheterocycle or other repeating unit that is known to yield a π-conjugated polymer, and where the repeating unit is capable of being substituted with a side chain containing a functional group that is not ionic, but can subsequently be converted into an ionic group. The non-ionic precursor CP possesses a sufficient proportion of the side chain substituted repeating units and can be formed readily by polymerization of the monomer from which the repeating unit is derived. Individual repeating units can contain a single substituent that can be ionized or a plurality of ionizable substituents. The precursor CP must have a sufficient proportion of these side chains such that water solubility results upon conversion of the precursor functionality to an ionic functionality. Side chains can contain up to 20 carbon, nitrogen, oxygen, sulfur, or silicon atoms per ionic group. In some embodiments of the invention, substituents can be included on repeating units, for example oligo(oxyethylene)s, that promote water solubility, but are not groups that can be converted into a stable ion. Before conversion of the precursor functional groups to ionic functional groups, water solubility does not result because of the water solubility promoting non-ionic groups. When water solubility promoting non-ionic repeating units are present in the ionic CP, they must be of an insufficient quantity, such that the ionic CP can be converted to a water insoluble CP. The precursor CP can be dispersed in a solvent from which it can be transformed into the ionic CP without being dissolved.

The non-ionic repeating units of the precursor CP can be any that can be transformed from a non-ionic form to an ionic form, yielding the ionic repeating units of the ionic CP. In one embodiment of the invention, some or all non-ionic precursor repeating units of the precursor CP can be esters of acids, for example esters of carboxylic acids, thiocarboxylic acids, dithiocarboxylic acids, boronic acids, sulfonic acids, or phosphonic acids. These esters can be hydrolyzed in the presence of an acid to form an acid and subsequently neutralized with a base or can be hydrolyzed in the presence of a base to form the salt of the acid, and constitute an anionic repeating unit of the ionic CP. For example, the ester can be an alkyl ester of the carboxylic acid where the alkyl group is derived from an alkyl alcohol and provides non-aqueous solubility to the precursor CP. In other embodiments of the invention, the ester can be derived from an aryl alcohol. In another embodiment of the invention the acid portion, for example, a carboxylic acid ester, can be derived from an alkyl or aryl group that contains one or more carboxylic acid groups, where each ester can be cleaved to ionic carboxylate salts, such that one or more ion pairs can be formed on a single side chain of a repeating unit. The salt can be that with an alkali metal or other cation that promotes water solubility. For example, the cation can be a tetraalkylammonium ion of less than 20 carbons. Subsequent conversion of a tetraalkylammonium salt of the ionic CP to an insoluble CP can be carried out by a thermal reaction where the anion of the salt promotes substitution or elimination reactions on the tetraalkylammonium ion. The insoluble CP can be formed from the acid base reaction of the salts of the ionic CP with a stronger acid than the conjugate acid of the salt. The acid can be a sulfonic acids, haloacids (HF, HCl, HBr, HI), nitric acid, perchloric acid, carboxylic acids (formic, acetic, proprionic), sulfuric acid, or organic soluble salts of a Lewis acid such as group 2 metals, zinc, and silver, as can be appreciated by one skilled in the art.

In another embodiment of the invention, the pro-ionic repeating unit of the precursor CP has a side chain, including an amine, imine, phosphine, thiol or thioether, which can be converted into a cationic species by protonation with an acid or reaction with an electrophile to form a cationic alkylated repeating unit of the ionic CP, for example, the formation of a tetraalkylammonium salt. In another embodiment of the invention, the non-ionic precursor can have a repeating unit that is substituted with a ligand that can be complexed with a metal to form an ionic CP. Examples of these three types of ionic repeating units that can be included in the ionic CP are illustrated in FIG. 1. In some embodiments of the invention, the ionic CP can have at least one covalently linked ion per repeating unit of the CP. The repeating unit can be a single aromatic ring or fused aromatic rings and the ionic group can be connected to the repeating unit, for example, by a series of covalent bonds.

The repeating units of the precursor CP may be of a single structure, a homopolymer CP, or of two or more structures, a copolymer CP, including terpolymer, tetrapolymer, or those having even more different repeating units. Homopolymers or regular or random copolymers may be linear, branched, hyperbranched or dendritic. Regular copolymers may be an alternating copolymer or one with a repetitive sequence of repeating units. Based on the substitution of the repeating units, independently, the homopolymers and copolymers may be regio-regular or region-random. The CP may be part of a block or graft copolymer, where one or more blocks or the backbone of one or more grafts of the copolymer may be a non-conjugated polymeric sequence, or all blocks or all backbones and/or grafts may be conjugated. For all structures, a sufficient proportion of repeating units have at least one side chain that can be rendered ionic such that water solubility can result upon conversion to the ionic CP, and where a subsequent transformation yields a water insoluble CP, such that the entire polymer can comprise a structure, such as a film (layer) when rendered insoluble.

The precursor CP can have various types of repeating unit sequences where a sufficient proportion of the repeating units is appropriately substituted with side chains to allow the formation of the water soluble ionic polymer. The repeating units that can be so substituted and the possible sequences to achieve specific properties, for example specific colors in a reduced or oxidized form of an electrochromic polymer (ECP), are taught in Amb et al., "Soluble Alternating Donor-Acceptor Conjugated Polymer Electrochromes" PCT Application No. PCT/US2010/040929, filed Jul. 2, 2010; Beaujuge et al. "Black Soluble Conjugated Polymers with High Charge Carrier Mobilities" PCT Patent Application Publication No. WO2010/062948 A2, Jun. 3, 2010; Beaujuge et al., "Green Soluble Conjugated Polymers with High Charge Carrier Mobilities" PCT Patent Application No. PCT/US2010/36172, filed May 26, 2010; Reynolds et al., "Multi-Colored Conjugated Polymers with Highly Transmissive Oxidized State" Provisional Application No. 61/347,091, filed May 21, 2010; Beaujuge et al., "Black Soluble Conjugated Polymers with Highly Transmissive Oxidized State" PCT Patent Application Publication No. WO 2009/117025, Sep. 24, 2009; Beaujuge et al., "Green To Transmissive Soluble Electrochromic Polymers" PCT Patent Application Publication No. WO2009/058877A1, May 7, 2009; Reynolds et al., "Variable Color Dioxyheterocycle Copolymers" PCT Patent Application Publication No. WO/2008/118704, Oct. 2, 2008; Reynolds et al., "N-Substituted 3,4-Alkylenedioxypyrroles, Ester Substituted Dihydroxypyrroles and Methods for Synthesis of These Pyrroles" PCT Patent Application No. WO 2007/041724 A1, Apr. 12, 2007; all of these disclosures are incorporated herein by reference.

According to an exemplary embodiment of the invention, a method to prepare an ionic CP and deposit the ionic CP is illustrated schematically by the chemical transformations that can be carried out in FIG. 2, where a highly water soluble ionic CP can be formed by hydrolysis of a precursor CP, deposited from aqueous solution and subsequently converted to a water insoluble CP. Beginning with the preparation of the monomer containing the repeating unit of the precursor polymer: in step i, transetherification is used to form a dibromo-propylenedioxythiophene 2; in step ii, nucleophilic substitution with NaCN yields the dicyano-propylenedioxythiophene 3; in step iii, hydrolysis of 3 yields the corresponding diacid 4; in step iv, esterification of 4 with dodecyl alcohol gives the corresponding dodecyl ester 5, the monomer for the precursor CP; in step v, the ester functionized monomer 5 is converted to the corresponding precursor CP 6 by a $FeCl_3$ mediated oxidative polymerization; in step vi, the precursor CP 6 is suspended in refluxing 2M KOH in methanol to yield a fine powder of potassium carboxylate salt 7; and in final step vii, the conversion of the potassium carboxylates of 7 to the carboxylic acids results in a water insoluble CP 8. The precursor CP 6 can be characterized using conventional methods for organic soluble polymers, including GPC and NMR. The ionic CP 7 is insoluble in methanol, toluene, and chloroform, but is highly soluble in water.

In an embodiment of the invention, as indicated in FIG. 1, the precursor CP can include repeating units with side chains that include an ester of a carboxylic acid, thiocarboxylic acid, dithiocarboxylic acid, sulfonic acid, a phosphonic acid, or other alkyl or aryl substituted acid. Subsequently, the ester can be converted to a salt of the acid in a water soluble ionic CP form. The ionic CP can be converted into an insoluble CP after deposition of the ionic CP from an aqueous solution. As indicated above for the exemplary carboxylate based anionic CP, the conversion to the insoluble CP can occur upon acidification. In another embodiment of the invention, the counterion of the anionic CP can be exchanged, such that monovalent cations are exchanged with: di- or polyvalent cations; or with di- or poly-cationic species such as cationic oligomers or polymers, to render a soluble ionic CP as an insoluble CP with an ionic "cross-linking". For example, conversion of an ionic CP to an insoluble CP that retains ionic functionality on the side chain can result by immersion of a film of an ionic CP having an alkali metal counter ion in a solution of calcium triflate to exchange the alkali ion with calcium. Aqueous or non-aqueous solutions of di- or polyvalent cations or di- or poly-cationic species can be used, such as a calcium triflate solution in methanol, to transform an ionic CP to an ionic insoluble CP.

In an embodiment of the invention, as indicted in FIG. 1, the precursor CP can have repeating units with side chains that have an amine, imine, or phosphine functionality, that are convertable into an ammonium, immonium or phosphonium salt by reaction with an acid to form a water soluble ionic CP. Alternatively, the side chains can have a protected functionality, for example a carbamate or amide group. Typically, the side chain will be of ten carbons or less. In some embodiments, the amine, imine, or phosphine of a precursor CP can be reacted with an electrophilic carbon of an alkyl group, an alkylating agent, to form an ammonium, immonium or phosphonium salt as the ionic CP. The alkylating agent can be, for example, an alkyl sulfonate, alkyl halide, alkyl sulfate, oxonium salt, or diazonium salt. Subsequently, the ionic CP can be converted by reaction with a base, with a nucleophile, or by thermal elimination of an olefin, as dictated by the structure of the ionic CP, to yield an insoluble CP, which may or may not have the same structure as the precursor CP. Reaction of an ionic group that is a protonated amine, imine, or phosphine with a base can form the insoluble CP. The base can be an alkali, alkaline earth, ammonium hydroxide, alkylammonium hydroxide, alkoxide carbonate, fluoride, or an amine, as is appropriate for the cationic functionality on the side chain of the ionic CP. When the ionic CP is that of an tetraalkylammonium, dialkylimmonium, or tetraalkylphosphonium ion on the side chain, elimination or substitution reactions can be carried out that cleave an alkyl group from each ion where the cleaved carbon-nitrogen or carbon-phosphorous bond can be a bond to the side chain or a bond extra to the side chain, such that the insoluble polymer can be fee of the nitrogen or phosphorous atom or include the nitrogen or phosphorous with the residual side chain, respectively, as can be readily appreciated by one skilled in the art. Nucleophiles that can be employed include alkyl sulfides, aryl sulfides, amines, phosphines, cyanide salts, azide salts, iodide salts, bromide salts, alkali metal alkoxides, or alkali metal amides, as is appropriate for the specific cation on the ionic CP.

In another embodiment of the invention, as illustrated in FIG. 1 for a specific tridentate ligand, the precursor CP can have side chains that include one or more bi or polydentate ligand that may be converted into an ionic CP based on the ligation of a metal ion to the ligand. The ionic CP can be converted to an insoluble CP that has the same structure as the precursor CP by exchange of the metal ion to a second bi or polydentate ligand that binds more strongly to the metal ion. The side chain ligand can comprise coordinating groups that are amines, amides, imines, phosphines, sulfides, carboxylates, or any combination thereof. The exchanging stronger ligand can comprise two to eight coordinating groups, comprising amines, amides, imines, phosphines, sulfides, carboxylates, or any combination thereof. The coordinating groups can be a portion of a linear chain, branched chain, cyclic, or polycyclic structure. The coordinated metal ion can be, for example, an alkaline earth metal, zinc, silver, iron, manganese, aluminum, gallium, first row transition metal, or lanthanide. Associated counterions can be, for example, nitrates, halides, triflates, tetrafluoroborates, hexafluorophosphates, sulfonates, or any other anion that is weakly coordinating and promotes solubility in both water and organics.

According to an embodiment of the invention, a film comprising an insoluble CP that can be rendered water soluble by exposure to a strong aqueous acid or base solution forms an active layer in conjunction with an aqueous electrolyte solution. The active layers can be employed as electrochromic films, charge injection layers for solar cells, LED's, FETs, supercapacitors, batteries, electronic paper, anti-static coatings, transparent conductors, sensors, anti-microbial coatings, adhesives, RFIDs, and memory systems.

Methods and Materials

All reagents and starting materials were purchased from commercial sources and used without further purification unless otherwise noted. ITO electrodes were purchased from Delta Technologies, Ltd. (7×50×0.7 mm, sheet resistance, $R_s$ 8-12 Ω/sq).

$^1$H-NMR and $^{13}$CNMR spectra were collected on a Mercury 300 MHz using $CDCl_3$ and the residual $HCCl_3$ peak as references ($^1$H: δ=7.26 ppm, $^{13}$C: δ=77.23 ppm). Elemental analyses were carried out by the CHN elementary analysis service in the Chemistry Department of the University of Florida. High resolution mass spectrometry was performed using a Finnigan MAT 95Q Hybrid Sector, a Bruker APEX II FTICR, or Agilent 6210 TOF. ATR-IR measurements were performed on a Perkin-Elmer Spectrum One FTIR outfitted with a $LiTaO_3$ detector, where spray-cast sample films on ITO were pressed onto a 60° ZnSe flat-plate crystals and spectra were baseline corrected using the software's auto-baseline correct function. Absorption spectra and chronoabsorptometry measurements were performed using a Varian Cary 500 UV-vis/NIR spectrophotometer. Electrochemical measurements were done using an EG&G Princeton Applied Research model 273A potentiostat/galvanostat under the control of Corrware software in a 3-electrode configuration with ITO working electrodes, $Ag/Ag^+$(used for non-aqueous solutions) or Ag/AgCl (used with aqueous solutions) reference electrodes, and Pt wire counter electrodes.

Figure 2:
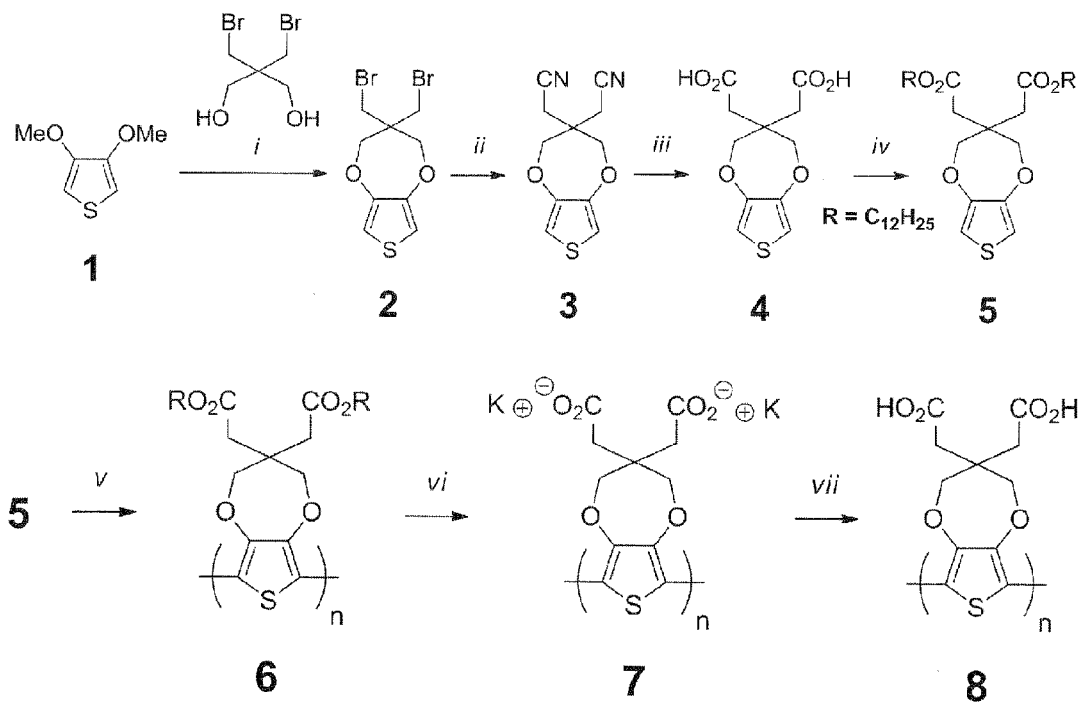
FIG. 2 is a schematic illustration of the synthesis of a monomer 5, its polymerization to precursor CP 6, the conversion to the water soluble ionic CP 7, and the conversion of 7 to an insoluble CP 8, according to an embodiment of the invention, by the steps: i pTSA, toluene; ii NaCN, DMF; iii NaOH, then HCl; iv EDCI/DMAP, DCM, 1-dodecanol; v $FeCl_3$, $CHCl_3$; vi KOH, MeOH; and vii pTSA·1.5 $H_2O$, MeOH.

As illustrated in FIG. 2, an exemplary monomer synthesis was carried out by transesterification between 3,4-dimethoxythiophene 1 and 2,2-Bis(bromomethyl)-1,3-propanediol in the presence of p-toluenesulfonic acid in toluene at 110° C. for 24 hours to yield 3,3-Bis(bromomethyl)-3,4-dihydro-2H-thieno[3,4-b][1,4]dioxepine 2, where details of the synthesis and characterization of 1 and 2 can be found in Reeves et al., *Macromolecules* 2004, 37, 7559-69, incorporated herein by reference. A 500 mL single-neck round bottom flask was filled with 200 mL of DMSO, compound 2 (6 g, 17.5 mmol), and sodium cyanide (2.6 g, 52.6 mmol). The mixture was stirred at 32° C. over a period of 10 days. The reaction mixture was allowed to cool to room temperature, added to water (300 mL) and extracted 3 times with dichloromethane (3×200 mL). The organic phase was washed with water (3×200 mL), dried over magnesium sulfate, and the solvent was removed affording a yellow oil. The resulting yellow oil was purified by column chromatography on silica with dichloromethane as eluent. The solvent was evaporated, 3,3-Bis(cyanomethyl)-3,4-dihydro-2H-thieno[3,4-b][1,4]-dioxepine 3 was dissolved in ethanol, and obtained as a white crystalline solid upon evaporation of ethanol (4.44 g, 74%). $^1$H NMR (300 MHz, $CDCl_3$): δ=6.61 (s, 2H), 4.02 (s, 4H), 2.74 (s, 4H). $^{13}$C NMR (75 MHz, $CDCl_3$): δ=148.64, 115.4, 107.49, 75.0, 43.1, 21.25. HRMS calcd for $C_{11}H_{10}O_2N_2S$, 235.0536. found, 235.0552. Anal. calcd for $C_{11}H_{10}O_2N_2S$: C, 56.39; H, 4.3; N, 11.96; S, 13.69. Found: C, 56.39; H, 4.3; N, 11.93 S, 13.53.

Compound 3 (2.39 g, 10.2 mmol) was charged into a 250 mL 2-neck round-bottom flask equipped with a condenser. A solution of sodium hydroxide (100 mL, 2M in water/ethylene glycol (1:1 v/v)) was poured into the reaction flask, and the mixture was stirred at 95° C. for 12 h. The reaction mixture was allowed to cool to room temperature, and a solution of HCl (1M) was used to adjust the mixture to a pH ~3-4. The adjusted mixture was extracted with ether (3×150 mL), and the combined organic phase was washed with water (3×100 mL) and dried over $Mg_2SO_4$. Ether was removed by rotary evaporation, and the resulting yellow oil was purified by column chromatography on silica with ethyl acetate as eluent. The solvent was evaporated, and compound 4, 2,2'-(3,4-dihydro-2H-thieno[3,4-b][1,4]dioxepine-3,3-diyl)diacetic acid, was obtained as a white-yellow crystalline solid (2.39 g, yield 86%). $^1$H NMR (300 MHz, $CDCl_3$): δ=12.3 (s, 2H), 6.74 (s, 2H), 4.0 (s, 4H), 2.5 (s, 4H). $^{13}$C NMR (75 MHz, $CDCl_3$): δ=172.9, 150.1, 106.7, 76.6, 42.9, 35.8. HRMS calcd for $C_{11}H_{12}O_6S$, 273.0427. found, 273.0427. Anal. calcd for $C_{11}H_{12}O_6S$: C, 48.52; H, 4.44; S, 11.78. Found: C, 48.62; H, 4.37; S, 11.07.

Compound 4 (1 g, 3.7 mmol), 1-dodecanol (2.74 g, 14.7 mmol), 1-(3-dimethylaminopropyl)-3-ethylcarbodiimide (EDCI, 4.26 g, 22.2 mmol), and 4-dimethylaminopyridine (DMAP, 2.71 g, 22.2 mmol) were charged into a 250 mL single-neck round bottom flask placed under argon. DCM (200 mL) was added to the flask, and the reaction mixture was stirred at room temperature for 6 hours. The mixture was then extracted with ether (3×150 mL), the organic phase was washed with water (3×100 mL), and dried over $Mg_2SO_4$. Ether was removed by rotary evaporation, and the resulting oil was purified by column chromatography on silica with hexanes:ethyl acetate (7:1) as eluent. The solvent was evaporated to yield compound 5, Didodecyl 2,2'-(3,4-dihydro-2H-thieno[3,4-b][1,4]dioxepine-3,3-diyl)diacetate as a clear oil (1.97 g, yield 88%). $^1$H NMR (300 MHz, $CDCl_3$): δ 6.45 (s, 2H), 4.1 (s, 4H), 4.06 (t, 4H), 2.68 (s, 4H), 1.61 (t, 4H), 1.26 (m, 36H), 0.88 (t, 6H). $^{13}$C NMR (75 MHz, $CDCl_3$): δ 171.16, 149.5, 105.43, 76.43, 65.07, 43.36, 36.38, 32.14, 29.88, 29.85, 29.81, 29.75, 29.58, 29.48, 28.76, 26.15, 22.91, 14.34. HRMS calcd for $C_{35}H_{60}O_6S$, 609.4144. found, 609.4170. Anal. calcd for: C, 69.04; H, 9.93; S, 5.27. Found: C, 69.47; H, 10.06; S, 5.10.

Compound 5 (647 mg, 1.07 mmol) was dissolved in chloroform (50 mL). A solution of anhydrous $FeCl_3$ (865 mg, 3.2 mmol, 5 eq) in nitromethane was added dropwise at room temperature over a period of 45 minutes to the stirred monomer where the monomer solution turned progressively more intensely green with addition of the oxidizing agent. The mixture was stirred 16 hours at room temperature. CP, PProDOT-ester, 6 was precipitated into methanol (300 mL). The precipitate was filtered, redissolved in chloroform (300 mL), and stirred for 1 hour with hydrazine monohydrate (6 mL). After evaporation, the purple concentrate of 6 was precipitated into methanol (300 mL), filtered through a Soxhlet thimble, and purified via Soxhlet extraction for 24 h with methanol. CP 6 was extracted with chloroform, concentrated by evaporation, precipitated in methanol (300 mL), and collected as a dark purple solid (462 mg, 71%). $^1$H NMR (300 MHz, $CDCl_3$): δ=4.23 (bs, 4H), 4.09 (bs, 4H), 2.81 (bs, 4H), 1.61 (bs, 4H), 1.25 (bs, 36H), 0.87 (bs, 6H). GPC analysis: Mn=39.5 kDa, Mw=84.9 kDa, PDI=2.15.

Precursor CP 6 was suspended in a 2M solution of KOH in MeOH (50 mL), was refluxed and simultaneously sparged with argon for two hours, and 100 mg of 6, 1.65 mmol of repeating units, was added as a solid. This suspension was refluxed for 24 hours, during which time the polymer achieved a fine particulate state. The suspension of ionic CP, PProDOT-salt, 7 was filtered using a nylon filter membrane, washed with 100 mL methanol followed by 100 mL diethyl ether, and dried under vacuum to give 53 mg (93%) of a black solid. Elemental Analysis Calc. for $C_{11}H_8K_2O_6S$: Calc. C, 38.14; H, 2.33. Found C, 37.63; H, 3.34.

The ionic CP, PProDOT-salt, 7 is insoluble in MeOH, toluene and $CHCl_3$, yet highly soluble in water at room temperature. The ionic CP 7 was dissolved in water at 2 mg mL$^{-1}$. The resulting aqueous solution was filtered and the filtered solution spray-cast onto ITO-coated glass slides using high-pressure argon (50-60 psi) with low solution flow rates to achieve homogeneous films of varying thicknesses. The deposited films were neutralized by immersion in a MeOH solution of PTSA, of about 1 mg mL$^{-1}$, to yield the insoluble CP, PProDOT-acid, 8.

Figure 3:
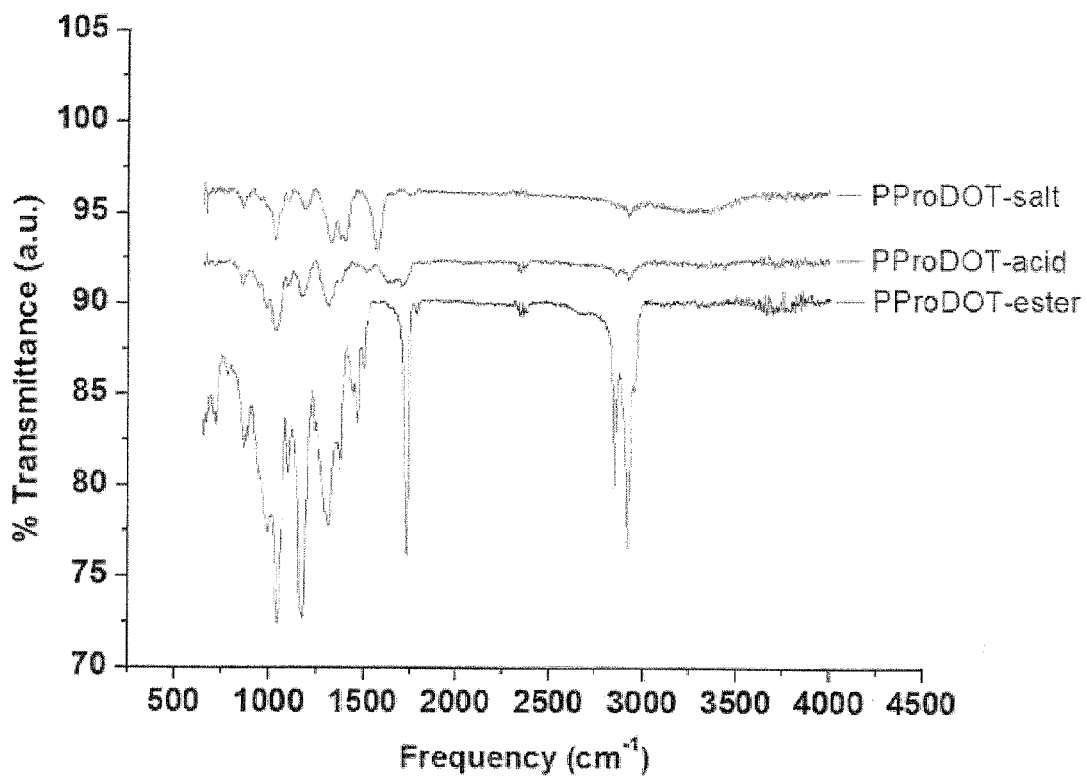
FIG. 3 shows the infrared spectra of precursor CP 6 (top), ionic CP 7 (middle) and insoluble CP 8 (bottom) according to an embodiment of the invention.

The conversion of the precursor CP 6 to the ionic CP 7 and its subsequent conversion to an insoluble CP 8 were monitored by attenuated total reflectance infrared spectroscopy (ATR-IR), as shown in FIG. 3. The conversion from the ester-derivatized precursor CP 6 to a polycarboxylate salt, ionic CP 7 is evidenced by a distinct shift of the C=O stretching band towards lower frequencies (from ca. 1730 to 1570 cm$^{-1}$) accompanied by a broadening of the same band. Additionally, a significant drop in C—H stretch intensity in the 3200-2800 cm$^{-1}$ frequency region reflects the loss of the $C_{12}H_{25}$ side-chains of the ester. Upon protonation of the carboxylates, the transformation of ionic CP 7 to insoluble CP 8 is evident by the C=O stretch's shifts to higher frequencies (ca. 1650-1710 cm$^{-1}$) and the stretches bimodal nature with a high frequency peak (1710 cm$^{-1}$) corresponds to a fully protonated carboxylic acid functionality and a low frequency peak (1650 cm$^{-1}$), which, tentatively, is attributed to a pair of carboxylate moieties sharing the same proton.

Figure 4:
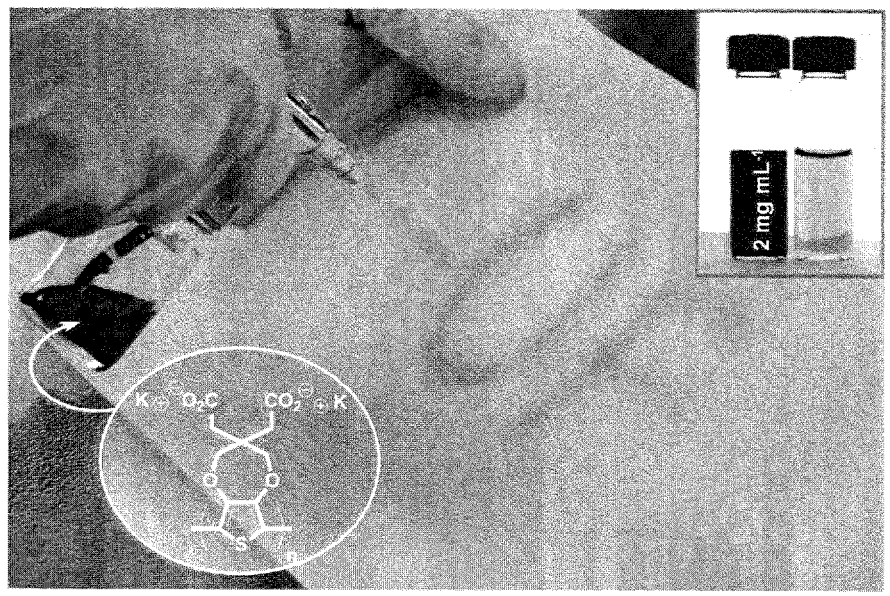
FIG. 4 shows the deposition of ionic CP 7 from a concentrated water solution using a conventional air-brush, according to an embodiment of the invention.
Figure 5:
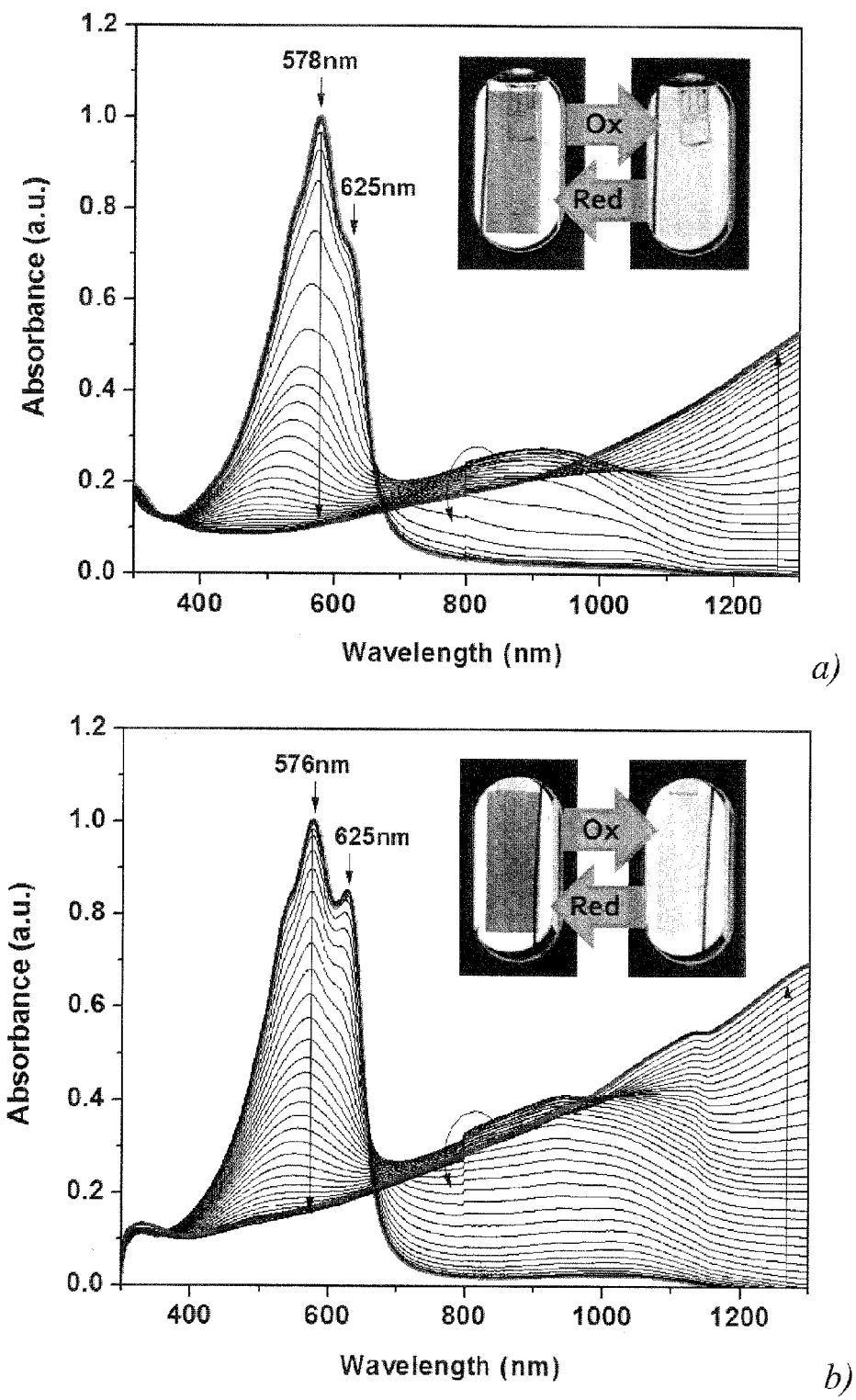
FIG. 5 shows spectroelectrochemistry plots of absorbance (normalized to the absorbance maximum for: a) a film of precursor CP 6 for a film spray-cast from a toluene solution (2 mg $ml^{-1}$) on ITO-coated glass using an electrolyte solution of 0.2 M lithium bis(trifluoromethylsulfonyl)imide (LiBTI) in propylene carbonate (PC) with an applied potential increased in 25 mV steps from −0.47 V→+0.46 V vs. $Fc/Fc^+$ and b) a film of insoluble CP 8 formed by spray-casting 7 from an aqueous solution (2 mg $ml^{-1}$) on ITO-coated glass and neutralized by immersion in a 1 mg $mL^{-1}$ solution of PTSA in MeOH using an electrolyte solution of aqueous 0.2 M NaCl with an applied potential increased in 25 mV steps from −0.50 V→>+0.55 V vs. Ag/AgCl where inset photographs show the color states obtained on electrochemical switching from a neutral state on the left to a fully oxidized state on the right, according to an embodiment of the invention.
Figure 6:
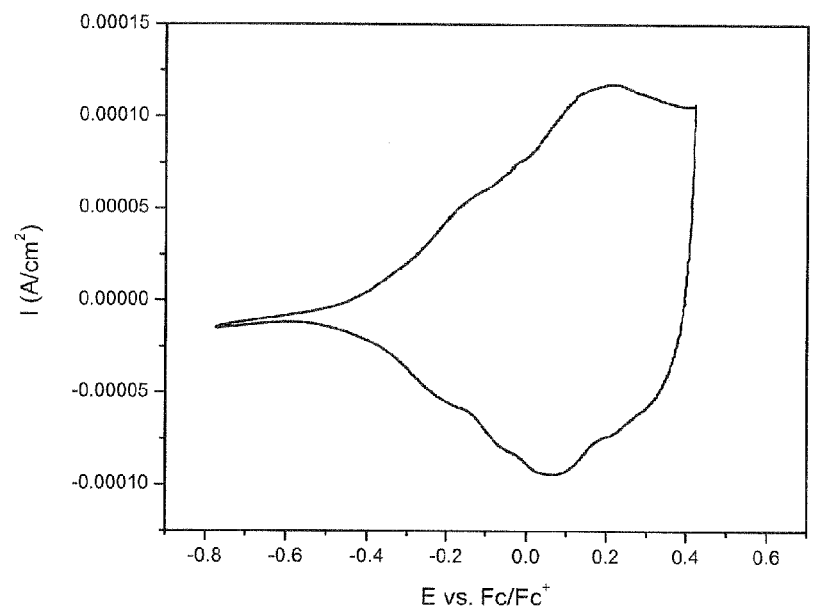
FIG. 6 shows: a) a cyclic voltammagram and b) a differential pulse voltammagram (DPV) of a spray-cast film of 6 in 0.2 M LiBTI/PC solution measured against a $Ag/Ag^+$ reference electrode and calibrated to the ferrocene/ferrocenium couple (Pt wire CE) where the cyclic voltammagram was carried out at a 50 mV/s scan rate, and the DPV was carried out using a 2 mV step size, step time 0.038 s, and 100 mV pulse amplitude.
Figure 6:
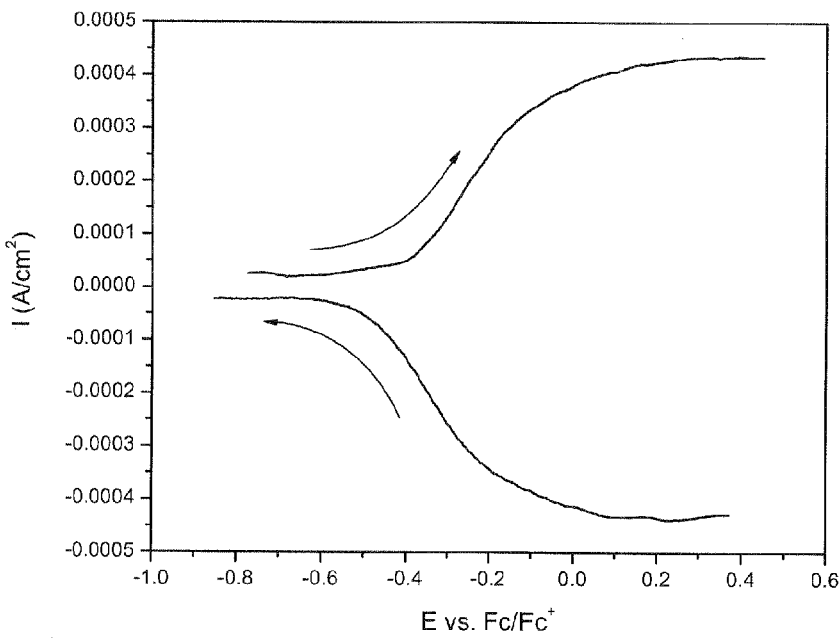
Figure 7:
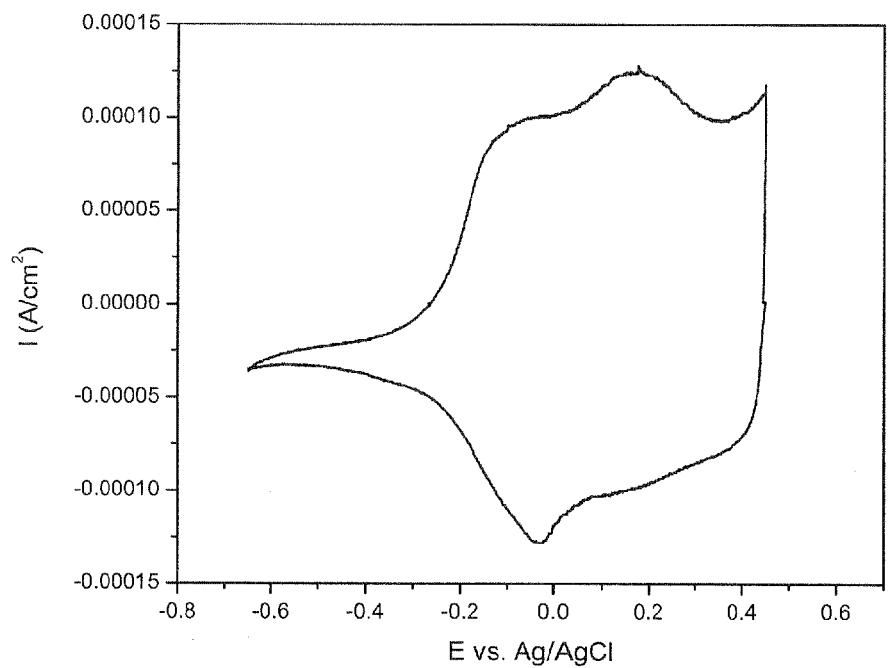
FIG. 7 shows a) a Cyclic voltammagram and b) a DPV of a spray-cast film of 8 on an ITO electrode in 1 M Kill solution, vs. Ag/Gal (pt wire CE) where the cyclic voltammagram was carried out at a 50 mV/s scan rate, and the DPV was carried out using a 2 mV step size, step time 0.038 s, and 100 mV pulse amplitude.
Figure 7:
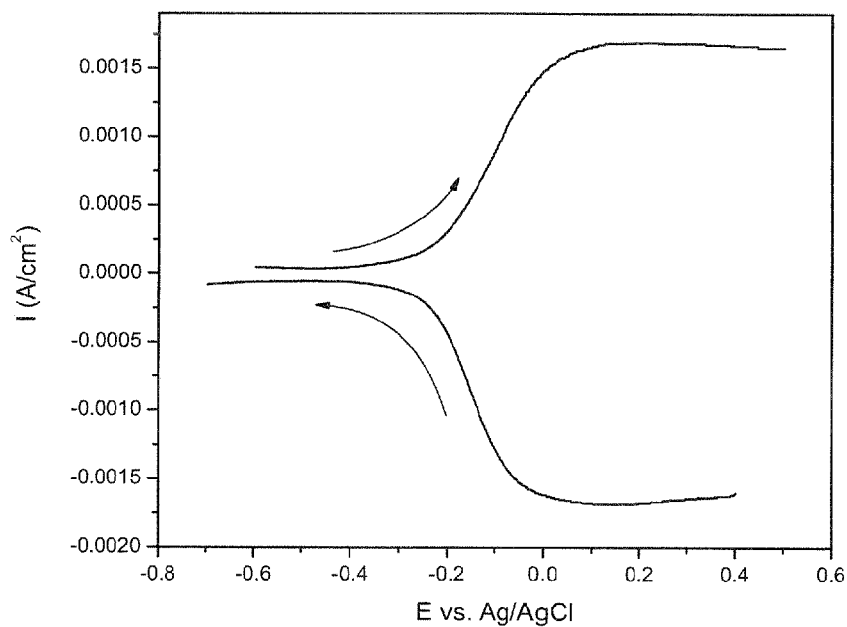

A film of precursor CP, PProDOT-ester 6 (Abs. Max.=0.87 a.u.) and a film of ionic CP PProDOT-salt 7 (Abs. Max.=1.2 a.u.) were spray-cast onto ITO-coated glass using 25 psi (6) or 50 psi (7) from 2 mg/mL solutions (pre-filtered with 0.45 μm PTFE syringe filters) in toluene (6) or water (7), and characterized the same day as they were cast. FIG. 4 shows the spray deposition of a concentrated water solution of PProDOT-salt 7 using a conventional air-brush. Films of 7 were immersed in a solution of p-TSA in methanol 1 mg/mL for 2 minutes, then methanol for 1 minute, and water for 1 minute to yield an insoluble film of PProDOT-acid 8. The films of 6 and 8 were redox cycled until a stable and reproducible electrochemical switch was reached. Electrochemical oxidation of PProDOT-ester 6 was carried out in 0.2 M lithium bis(trifluoromethylsulfonyl)imide (LiBTI)/propylene carbonate (PC) supporting electrolyte using a Ag/Ag$^+$reference electrode with a platinum wire counter electrode. The electrochemical oxidation of PProDOT-acid 8 was carried out in 0.2 M NaCl/water supporting electrolyte using a Ag/AgCl reference electrode. FIG. 5 shows that the visible absorption of: a) 6; and b) 8, where both display a maximum at about 577 nm in the neutral state that bleaches extensively with increasing applied potential. This change in visible absorption is accompanied by the formation of polaronic and bipolaronic transitions in the near-IR. Once fully doped, only residual absorption can be detected in the 400-700 nm range, as is desired for a colored-to-transmissive switching ECP. For precursor CP 6 and insoluble CP 8, the onset of oxidation is consistent with low values for cyclic voltammetry and differential-pulse voltammetry (DPV) of approximately −0.37 V vs. Fc/Fe$^+$ and −0.23 V vs. Ag/AgCl for 6 and 8, respectively, as shown in FIG. 6 and FIG. 7. The bandgap of polymers 6 and 8 are nearly identical and remain relatively constant, as determined from the onset of absorption of the solid thin films, with a bandgap on the order of 1.8 eV. On transformation from the colored neutral state to the transmissive oxidized state, a transmittance change on the order of 60% is estimated using the maximum of absorption as reference. The differences in saturation, hue, and intensity for the color states and transmissive states attained for 6 and 8 can be appreciated from the photos of oxidized and reduced films shown in the insets in FIG. 5a and 5b. There is no significant alteration of the neutral purple-blue state of the electrochrome, as indicated by very similar neutral absorption spectra of the two films, with the exception that the vibronic features appear to be more pronounced in PProDOT-acid 8 thin films. No appreciable difference in transmissivity is observed between the doped state of 6 and 8, with both achieving a remarkably high level of transparency when fully oxidized.

Figure 8:
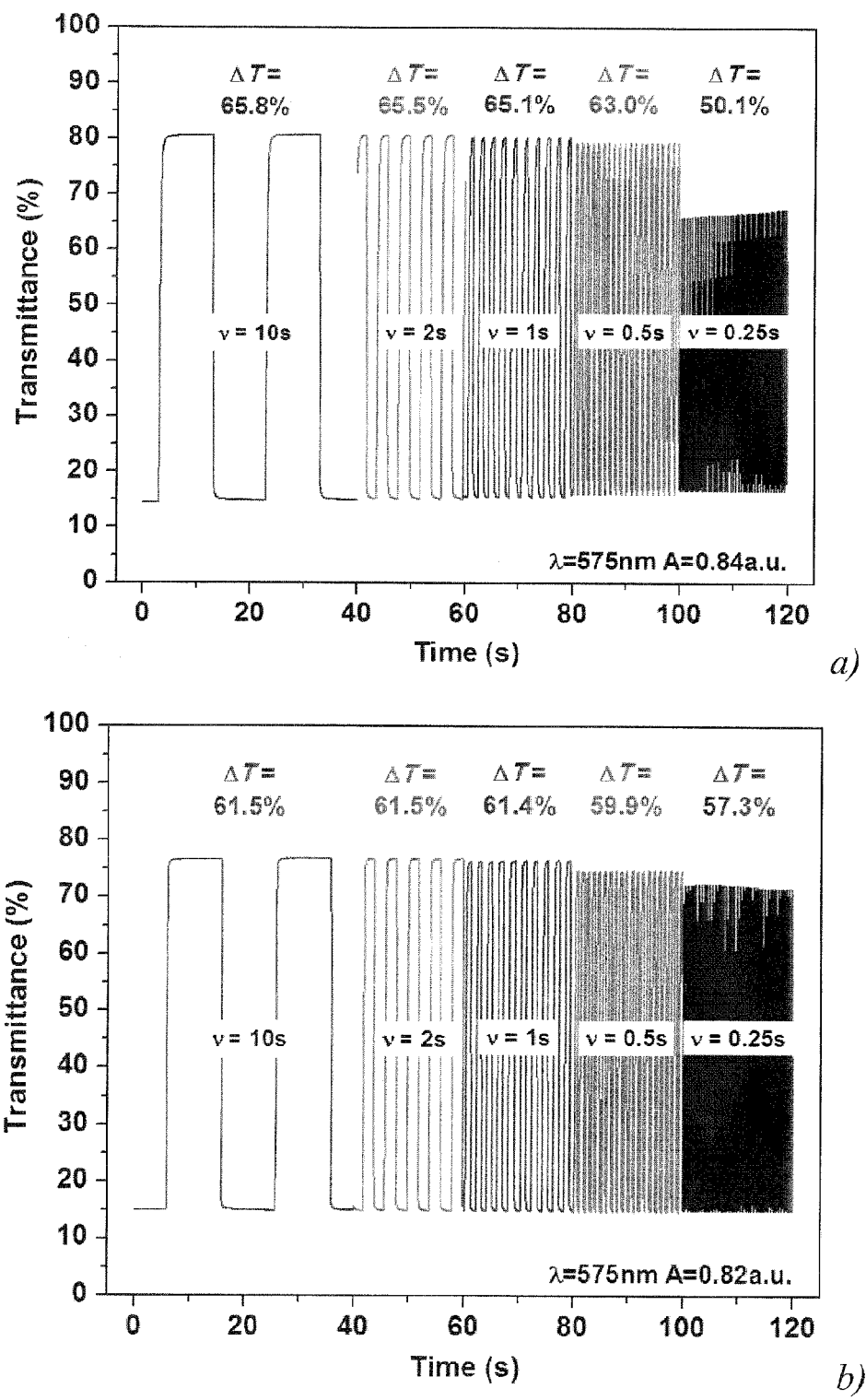
FIG. 8 shows square-wave potential step absorptometry followed by monitoring the transmittance at 575 nm using switching times of 10 s step for 40 s (two cycles), 2 s step for 20 s (five cycles), 1 s step for 20 s (ten cycles), then 0.5 s step for 20 s and 0.25 s step for 20 s for: a) 6 spray-cast onto ITO-coated glass from toluene with an electrolyte of 0.2 M LiBTI/PC solution at a switching potential range of −0.6 V→+0.475 V vs. Fc/Fc$^+$; and b) 8 PProDOT-acid formed by spray-casting 7 from an aqueous solution (2 mg ml$^{-1}$) on ITO-coated glass and neutralized by immersion in a 1 mg mL$^{-1}$ solution of PTSA in MeOH using an electrolyte solution of aqueous 1 M KNO$_3$ at a switching potential range of −0.65 V→3+0.475 V vs. Ag/AgCl.

The large optical contrasts for 6 and 8, as indicated by the spectroelectrochemical analysis, was found to be high while monitoring the transmittance of the spray-cast films as a function of time at the polymer absorption maxima with potential steps ranging from 10 to 0.25 seconds, as shown in FIG. 8. The stability was particularly high for the insoluble CP 8 using an aqueous electrolyte, and the retention in contrast, $\Delta T$, at the most rapid switching rate, was 93% of that observed for 8, as opposed to only 70% observed for 6 using thin films of near-identical thickness (Abs. Max.=0.82, and 0.84 a.u. respectively using 0.2M LiBTI/PC supporting electrolyte for 6 and 1M $KNO_3$/water supporting electrolyte for 8. This retention in contrast is consistent with faster ion diffusion processes for thin films of 8, perhaps due to the presence of protic-polar carboxylic acid/carboxylate moieties, imparting a superior affinity for the electrolyte. It is also consistent with apolar solubilizing side-chains in 6 inhibiting diffusion of doping ions across the thin film, of 6, and impacting the response time at higher switching rates.

Figure 9:
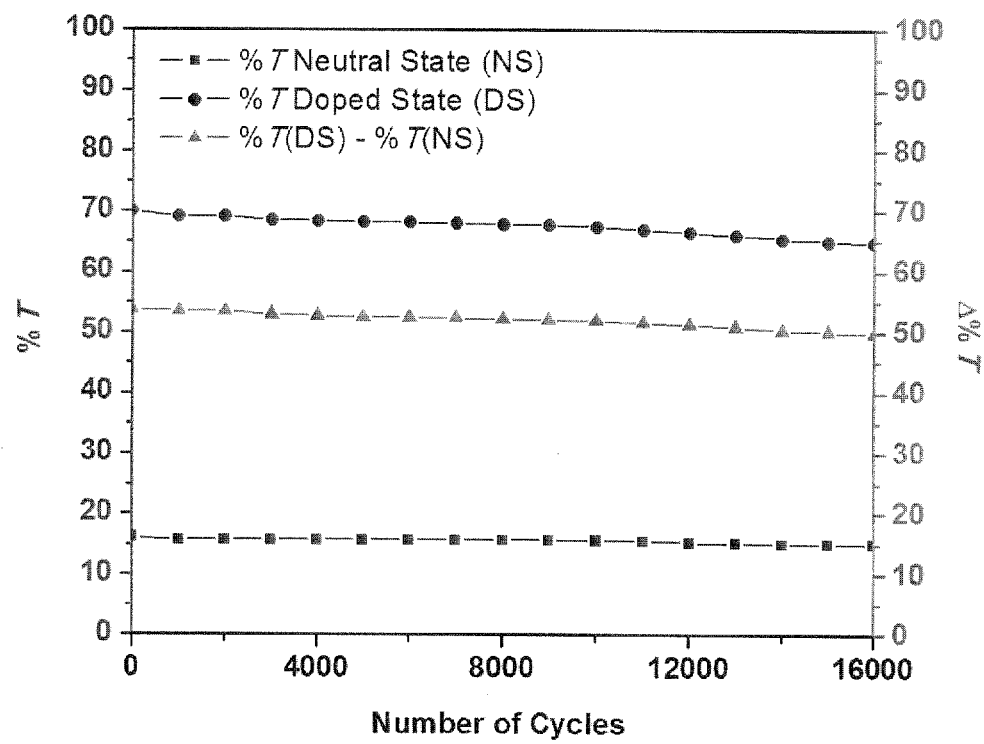
FIG. 9 shows a plot of the long-term switching of 8 on ITO using an aqueous 0.2 M LiBTI electrolyte solution with monitoring of the absorption at 575 nm while applying square-wave potential steps of 1 second, having a complete cycle of 2 seconds, over a switching potential range of −0.65 V→3+0.475 V vs. Ag/AgCl.

A film of 8, deposited by spray-casting 7 from aqueous solution onto ITO-coated glass, displays a long-term switching stability, as indicated from a 16,000 cycle of 1 second square wave potential step using 0.2M LiBTI/water as the supporting electrolyte, as illustrated in FIG. 9. Excellent redox stability, having less than 5% of contrast variation over the 16,000 cycles, indicates the potential for use in commercial applications. Although slightly lower contrast ratios were observed for LiBTI than $KNO_3$, a higher stability was observed and greater increases in stability may be possible with other electrolytes. Difference in long-term performances is expected for electrolyte salts that differ in their nucleophilicity and/or basicity.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A pi-conjugated polymer (CP) film, comprising an insoluble CP swollen by and/or contacting an aqueous electrolyte and being effectively free of any organic solvent, wherein the CP comprises repeating units having at least one side chain having a basic functionality and wherein the film can be dissolved by addition of an acid but not a base.

2. The CP film of claim 1, wherein the base unit is an amine, imine, phosphine, thiol or thioether.

3. A device, comprising an insoluble CP film according to claim 1, wherein the insoluble CP comprises a plurality of repeating units comprising an amine, imine, phosphine, thioether, or uncomplexed bidentate or polydentate ligand.

4. A pi-conjugated polymer (CP) film comprising an insoluble CP swollen by and/or contacting an aqueous electrolyte and being effectively free of any organic solvent, wherein the CP comprises repeating units having at least one side chain having an acid functionality and wherein the film dissolves in the presence of a base and wherein the film can be dissolved by addition of a base but not an acid.

5. The CP film of claim 4, wherein the acid functionality is a carboxylic acid, thiocarboxylic acid, dithiocarboxylic acid, sulfonic acid, phosphonic acid, boronic acid or any combination thereof.

6. A device, comprising an insoluble CP film according to claim 4, wherein the insoluble CP comprises a plurality of repeating units comprising a carboxylic acid, sulfonic acid, phosphonic acid, or boronic acid.

7. A method of depositing an insoluble pi-conjugated polymer (CP) film according to claims 1 or 4, comprising:
providing an aqueous ionic CP suspension or solution;
depositing the aqueous ionic CP suspension or solution on a surface to form an ionic CP film; and
converting the ionic CP film to an insoluble CP film.

8. The method of claim 7, further comprising:
providing a precursor CP as a suspension or solution in an organic solvent; and
transforming the precursor CP suspension or solution to the ionic CP suspension or solution.

9. The method of claim 8, wherein the precursor CP of the precursor CP suspension or solution comprises repeating units with at least one side chain that comprises an ester of a carboxylic acid, thiocarboxylic acid, dithiocarboxylic acid, sulfonic acid, phosphonic acid, or boronic acid.

10. The method of claim 9, wherein the ester is an alkyl substituted carboxylic acid ester.

11. The method of claim 9, wherein transforming comprises hydrolysis of the ester with one or more equivalents of base or comprises hydrolysis of the acid ester and subsequently adding of one or more equivalents of base to yield a salt of the acid.

12. The method of claim 11, wherein the base is the hydroxide of an alkali metal or a tetraalkylammonium.

13. The method of claim 12, wherein converting comprises reaction with an acid.

14. The method of claim 12, wherein the hydroxide is of the tetraalkylammonium and converting comprises thermal degradation of the tetraalkylammonium.

15. The method of claim 12, wherein converting comprises exchange of the alkali metal or tetraalkylammonium cations with a divalent or polyvalent cation.

16. The method of claim 8, wherein the precursor CP contains repeating units with at least one side chain comprising an amine, imine, phosphine or thioether.

17. The method of claim 16, wherein transforming comprises protonation by an acid.

18. The method of claim 17, wherein converting comprises addition of a base.

19. The method of claim 16, wherein transforming comprise reaction with an electrophilic carbon.

20. The method of claim 19, wherein the electrophilic carbon is of an alkyating agent.

21. The method of claim 20, wherein converting comprises thermal degradation.

22. The method of claim 19, wherein converting comprises reaction with a nucleophile.

23. The method of claim 8, wherein the precursor CP contains repeating units with at least one side chain comprising a bidentate or polydentate ligand.

24. The method of claim 23, wherein transforming comprises reaction with a metal salt.

25. The method of claim 24, wherein converting comprises exchange of the metal salt from the bidentate or polydentate ligand to a second bidentate or polydentate ligand.

26. The method of claim 7, wherein depositing comprises printing or spraying an aqueous ionic CP solution.

* * * * *

UNITED STATES PATENT AND TRADEMARK OFFICE
CERTIFICATE OF CORRECTION

PATENT NO. : 9,093,193 B2  Page 1 of 1
APPLICATION NO. : 13/196412
DATED : July 28, 2015
INVENTOR(S) : Chad Martin Amb, Pierre Marc Beaujuge and John R. Reynolds It is certified that error appears in the above-identified patent and that said Letters Patent is hereby corrected as shown below:

In The Specification

Column 1,
Line 40, "πconjugated" should read --π-conjugated--.

Column 5,
Line 9, "0.65 V→3+0.475 V" should read -- -0.65 V→+0.475 V--.
Lines 14-15, "-0.65 V→3+0.475 V" should read -- -0.65 V→+0.475 V--.

Column 13,
Line 21, "only 70%" should read --only 76%--.

Signed and Sealed this
First Day of March, 2016

Michelle K. Lee
*Director of the United States Patent and Trademark Office*